United States Patent [19]
Brown et al.

[11] Patent Number: 5,958,044
[45] Date of Patent: Sep. 28, 1999

[54] MULTICYCLE NOP

[75] Inventors: Richard A. Brown, Houston; Ray Simar, Richmond; Natarajan Seshan, Houston, all of Tex.

[73] Assignee: Texas Instruments Incorporated, Dallas, Tex.

[21] Appl. No.: 09/008,909

[22] Filed: Jan. 20, 1998

Related U.S. Application Data

[60] Provisional application No. 60/036,224, Jan. 24, 1997.

[51] Int. Cl.$^6$ ........................................... G06F 9/28
[52] U.S. Cl. ............................ 712/219; 712/215; 712/245
[58] Field of Search .................................... 395/595, 561, 395/591, 376, 391, 395

[56] References Cited

U.S. PATENT DOCUMENTS

| 4,855,947 | 8/1989 | Zmyslowski et al. | 712/216 |
| 5,515,519 | 5/1996 | Yoshioka et al. | 712/234 |
| 5,546,037 | 8/1996 | Kenny et al. | 327/230 |
| 5,727,194 | 3/1998 | Shridhar et al. | 712/241 |

FOREIGN PATENT DOCUMENTS 9-54693  2/1997  Japan.

*Primary Examiner*—Zami Maung
*Assistant Examiner*—Kenneth R. Coulter
*Attorney, Agent, or Firm*—J. Dennis Moore; Wade James Brady, III; Richard L. Donaldson

[57] ABSTRACT

A method for controlling the execution of a microprocessor to cause it to execute a NOP instruction for a programmable number of sequential cycles. A NOP instruction is provided, that includes a predetermined OP code field identifying the NOP instruction as a programmably multiple NOP instruction. A predetermined count field is provided, representing the number of sequential cycles in which a NOP operation is to be performed by said microprocessor. The NOP instruction OP code field is read, as is the NOP instruction count field. In response thereto, a NOP operation is performed for the number of sequential cycles represented by said NOP instruction count field.

8 Claims, 5 Drawing Sheets

MULTICYCLE NOP

This application claims priority under 35 U.S.C. § 119 (e)(1) of provisional application number 60/036,224 filed Jan. 24, 1997 pending.

TECHNICAL FIELD OF THE INVENTION

This invention relates to microprocessors, and more particularly relates to the instruction sets for microprocessors, specifically, the NOP instruction.

BACKGROUND OF THE INVENTION

Microprocessors, including general purpose microprocessors and DSPs, do useful work by being provided with instructions, which the microprocessors execute. The set of instructions which a particular microprocessor is designed to respond to is called its instruction set.

Microprocessor instructions instruct the microprocessor to, e.g., load values in registers; store values from registers to locations in main memory; add, subtract, multiply or divide values stored in registers or other storage locations, or perform Boolean operations on such values, such as OR or compare; shift register contents; and perform a variety of control operations, including testing and setting bits, outputting data to a port, pushing data to a stack and popping stack contents. Microprocessor instructions are typically expressed in mnemonic form. For example, one typical microprocessor instruction is ADD, which is the mnemonic for an addition operation, for example, to add the contents of one register to the contents of another register and place the result in an accumulator or other register.

A common microprocessor instruction is the NOP instruction, pronounced "no op," which instructs the microprocessor to perform no operation in the clock cycle in which it processes the NOP instruction. I.e., it is a kind of "place holder." This instruction is used by programmers in cases where, before a particular instruction can be executed, some other event needs to occur which does not involve executing an instruction in the microprocessor. For example, in a pipelined microprocessor a load operation from memory to a register may precede an instruction, such as an ADD instruction, that operates on the contents of that register, and the load operation may take two or more clock cycles to complete. If the ADD instruction were to immediately follow the load operation in a program, the value to be operated on in the ADD operation would not yet be loaded in the register, and the ADD instruction would fail, or would produce an invalid result.

In such cases, programmers have availed themselves of several expedients to solve this problem. One is to insert a sufficient number of NOP instructions in the program between the load instruction and the ADD instruction, to allow the requisite number of clock cycles to complete before the ADD instruction were allowed to execute. However, this multiplies the size of the program undesirably.

Another expedient is to execute a NOP with a loop instruction immediately after the load instruction. However, the loop instruction itself may take more cycles to execute than needed for the delay, resulting in computing inefficiency.

Still another expedient is to design into the registers themselves a function called "dependency interlock." This additional circuitry associated with one or more registers in the microprocessor detects the requirement that a register be loaded with a value before the instruction operating on that value can operate, and "locks" the instruction against execution until it is detected that a value has been so loaded. See, e.g., U.S. Pat. No. 5,430,851, which issued to Hroaki Hirata, et. al., and was assigned to Matsuchita Electric Industal Co., Ltd. However, this solution is expensive in terms of silicon area. It also adds to the complexity of the microprocessor circuit design and testing. For example, a modern pipelined, superscaler DSP may contain eight or more functional units, and eighteen or more source registers. The complexity involved in interlocking all of those elements is considerable. Further, adding such circuitry may cause speed path problems. Still further, since it may be that it is sometimes desirable to use a value already in the register, it adds to the complexity of the instruction execution and interlock function. And, finally, the addition of dependency interlocks results in a less "exposed" pipeline processor. That is, the internal components of the processor, such as the registers, are less available to the compiler, which is undesirable.

The present invention introduces a novel microprocessor instruction that solves these problems.

SUMMARY OF THE INVENTION

According to the present invention, there is provided a method for controlling the execution of a microprocessor to cause it to execute a NOP instruction for a programmable number of sequential cycles. A NOP instruction is provided, that includes a predetermined OP code field identifying the NOP instruction as a programmably multiple NOP instruction. A predetermined count field is provided, representing the number of sequential cycles in which a NOP operation is to be performed by said microprocessor. The NOP instruction OP code field is read, as is the NOP instruction count field. In response thereto, a NOP operation is performed for the number of sequential cycles represented by said NOP instruction count field.

In this way, with a single instruction multiple NOP operations can be forced in a stream of instructions, without the need for dependency interlocks in the microprocessor.

These and other features of the invention will be apparent to those skilled in the art from the following detailed description of the invention, taken together with the accompanying drawings.

DETAILED DESCRIPTION OF THE PREFERRED EMBODIMENT

The preferred embodiment provides a single NOP instruction that causes execution of a programmable number of sequential NOP operations. This instruction is referred to herein as the "multi-cycle NOP" instruction. This instruction has been implemented in a very large instruction word, or "VLIW", microprocessor, in which instructions are fetched in fetch packets in groups of eight, and then dispatched for execution in execute packets in groups of one to eight. The microprocessor is a parallel, pipelined processor having two data paths, each with four functional units.

Figure 1:
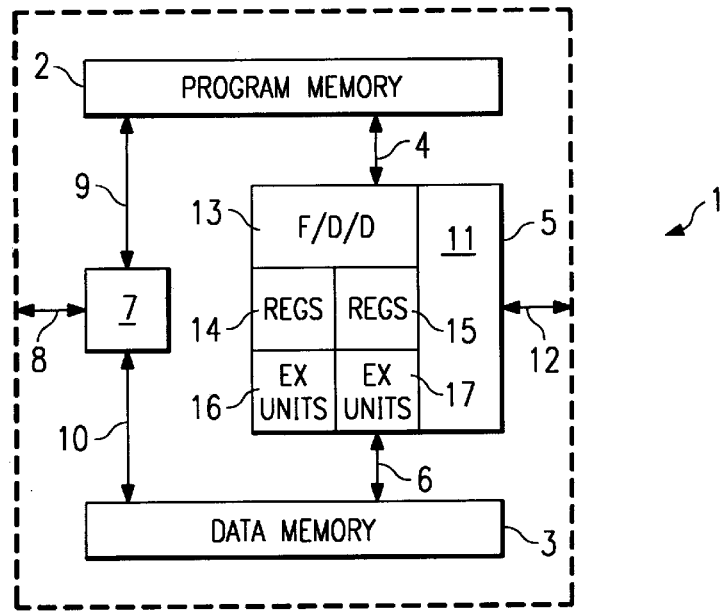
FIG. 1 is a block diagram of a microprocessor in which the preferred embodiment of the present invention may be implemented.

FIG. 1 is a high level architectural layout of such microprocessor 1, showing the main features thereof. The microprocessor may be a digital signal processor ("DSP"), and includes separate program memory 2 and data memory 3, either or both of which may be cached. Program instructions are fetched in fetch packets from program memory 2 across an instruction bus 4 to a central processing unit ("CPU") 5. Data are fetched from data memory 3 across a data bus 6 to the CPU 5. Address space is 32-bit byte-addressable.

Off-chip memory may be used, with an external memory interface and direct memory access controller peripherals 7. These peripherals 7 communicate with off-chip memory (not shown) by way of bus 8, with program memory 2 by way of bus 9, and with data memory 3 by way of bus 10. A second block of peripherals 11 is also provided, including timers, serial ports, and the like, communicating off-chip via bus 12.

The CPU 1 also includes the following units: an instruction fetch unit, an instruction dispatch unit and an instruction decode unit shown together as F/D/D units 13. The CPU 1 also includes two data paths, one data path to each of two sets of registers, register file A, 14, and register file B, 15. Two groups 16, 17, of four functional units each are provided.

The multi-cycle NOP instruction of the preferred embodiment of the present invention operates in the F/D/D units 12.

Figure 2:
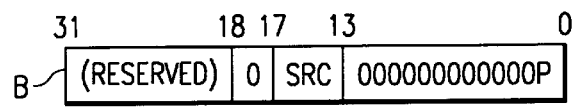
FIG. 2 is a diagram of a preferred form of multi-cycle NOP instruction.

A preferred form of this instruction is shown in FIG. 2. A multi-cycle NOP instruction, of the form NOP n, where n is a count value, provides n cycles of NOPs. If n≧2, the NOP is a multi-cycle NOP. A NOP 2, for example, fills in extra delay slots for the instructions in the execute packet it is contained in and for all previous execute packets. Thus, if a NOP 2 is in parallel with a multiply instruction, the multiply's results will be available for use by instructions in the next execute packet. If the delay slots of a branch complete while a multi-cycle NOP is still dispatching NOPs into the pipeline, the branch overrides the multi-cycle NOP and the branch target begins execution after the number of delay slots normally associated with the branch instruction for that architecture.

The instruction shown in FIG. 2 is represented by a block B of all of the bits comprising the instruction. The numbers appearing above the block B represent the bit positions in the instruction. The instruction of the preferred embodiment is designed for use in a thirty two bit instruction set. Thus, it can be seen that the least significant bit is identified as bit 0, and the most significant bit is identified as bit 31. Bits 0 through 12 are shown to be "000000000000p". Bits 13 through 16 are a field identified by "src". Bit 17 is a "0". Bits 18 through 31 are reserved for possible later use.

The src field, bits 13 though 16, represent an instruction repeat count, minus one. Thus, with an src value of "1", the instruction is repeated 1+1=2 times. That is, it is executed twice. Likewise, with an src value of six, the instruction is repeated 6+1=7 times. And so on. The src field is four bits. Thus, the instruction may be programmed to repeat up to $2^4-1$ times, i.e., fifteen times, i.e., up to sixteen NOP instructions can be forced by a single instruction of the type of the preferred embodiment of the present invention.

Alternatively, and in accordance with a preferred embodiment of the present invention, with an src field of four bits, the microprocessor may be architected to allow a repeat of the NOP instruction a number of times less than sixteen. The value "1111" for the src field may then be reserved for a special instruction, called the IDLE instruction. In an IDLE instruction, the pipeline is filled with delay slots continuously until an interrupt, such as reset, is presented to the microprocessor.

The "0" appearing at bit 17 is not used in the preferred embodiment. However, it may be desired to have more than 16 NOP instructions. Using bit 17 will allow up to 32 NOP instructions to be forced.

The "0"s appearing in bits 1 though 12 are the OP code. Thus, the OP code for this multi-cycle NOP instruction is 000000000000. This particular OP code is, of course, arbitrary, and is selectable as desired by the microprocessor designer to suit overall design needs.

The "p" appearing at bit 0 is unrelated to the instant invention, and is included merely to illustrate that this instruction may be readily adapted into existing microprocessor architectures. This p bit is a bit usable in a parallel processor to indicate that this instruction is to be operated on in parallel with the previous instruction in the instruction stream.

Figure 3:
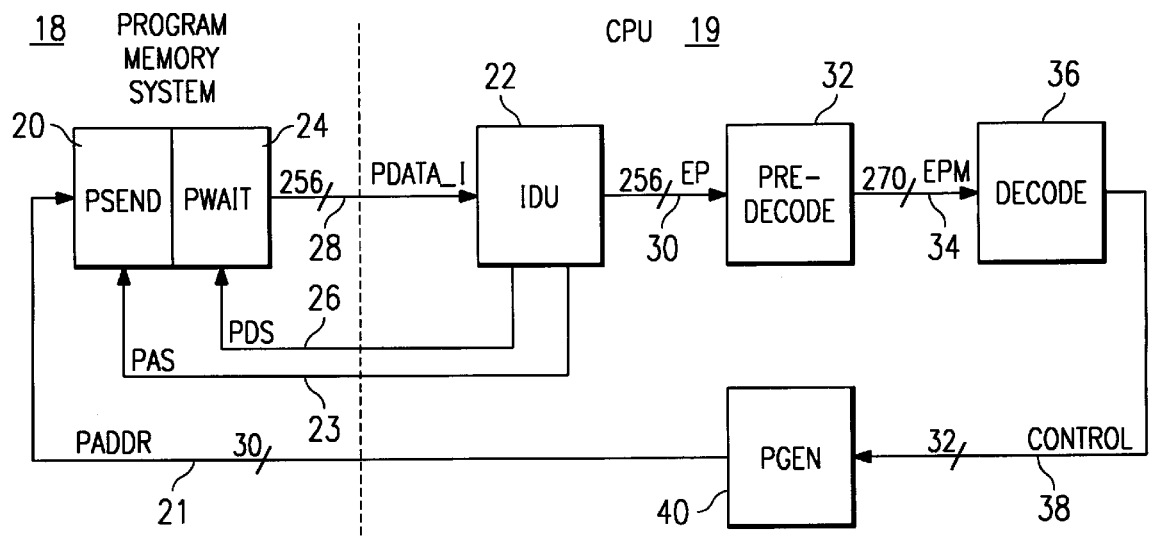
FIG. 3 is a diagram of the pipeline flow for a program instruction fetch and decode.

FIG. 3 shows the pipeline flow for a program instruction fetch and decode in a microprocessor in which the preferred embodiment of the present invention is implemented. The flow is divided into a program memory system, PMS 18, side and a central processing unit, CPU 19, side. On the CPU 19 side, the stages are implemented in individual units, bearing the name of that stage, e.g., the instruction dispatch stage is implemented in the instruction dispatch unit.

On the PMS side, in the psend stage 20 for an instruction fetch a program address, PADDR, is received on lines 21. An instruction dispatch unit, IDU, 22 generates and sends a program address strobe signal, PAS, on PAS lines 23 to the psend stage 20. When PAS is asserted it instructs the PMS 18 to latch a new program address as presented on the PADDR program address lines 21.

The next stage on the PMS 18 side is the pwait stage 24 in which the actual instruction is retrieved from the memory and made available to the IDU 22. The IDU 22 generates and sends a program data strobe signal, PDS, on PDS lines 26 to the pwait stage 24. When PDS is asserted it instructs the PMS 18 to latch at its program data output the program data, PDATA_I, associated with the program address latched on the last prior cyde. This program data, PDATA_I, is in the form of a fetch packet of eight thirty-two bit wide instructions, comprising 256 bits in all. The PDATA_I data is provided on PDATA_I lines 28 to the IDU 22.

The IDU 22 examines each fetch packet and parses it into packets of instructions capable of being executed in parallel, called execute packets, EP. These execute packets may be as small as one instruction, or as large as eight instructions. In the preferred embodiment the determination of which instructions of the fetch packet to combine into an execute packet is done on the basis of a bit, at bit position 0, in the instruction, called the "p-bit". If the p-bit of an instruction is a 1, then the next instruction in the fetch packet is executed in parallel with that instruction, unless the instruction bearing the p-bit is the last instruction, in which case it is not executed in parallel with the next instruction, i.e., execute packets do not overlap fetch packets. The execute packets are provided on the 256 bit wide EP lines 30 to a pre-decode unit 32.

In the pre-decode unit 32 each instruction in an execute packet is mapped to one of the ten functional blocks. The output of the pre-decode unit 32 is the 270 bit wide execute packet, EPM, data mapped to the ten functional blocks being assigned an instruction in the current cycle, provided on the EPM lines 34 to a decode unit 36.

The decode unit 36 reads the OP code fields for the instructions comprising the execute packet for the current cycle, and performs conventional decode functions, such as decoding read/write enables for register files, and the like. The decode unit 36 generates and provides control data, CONTROL, to a program address generator unit, PGEN, 40 on the CONTROL lines 38. The outputs of the decode unit 36 cause the execution of the instructions in the current execute packet, which may take up to ten separate execute phases, E1, E2, . . . E10, in up to ten corresponding cycles.

The PGEN 40 receives the CONTROL signals and generates the address for the next fetch packet, which it provides on the PADDR lines 21.

Figure 4:
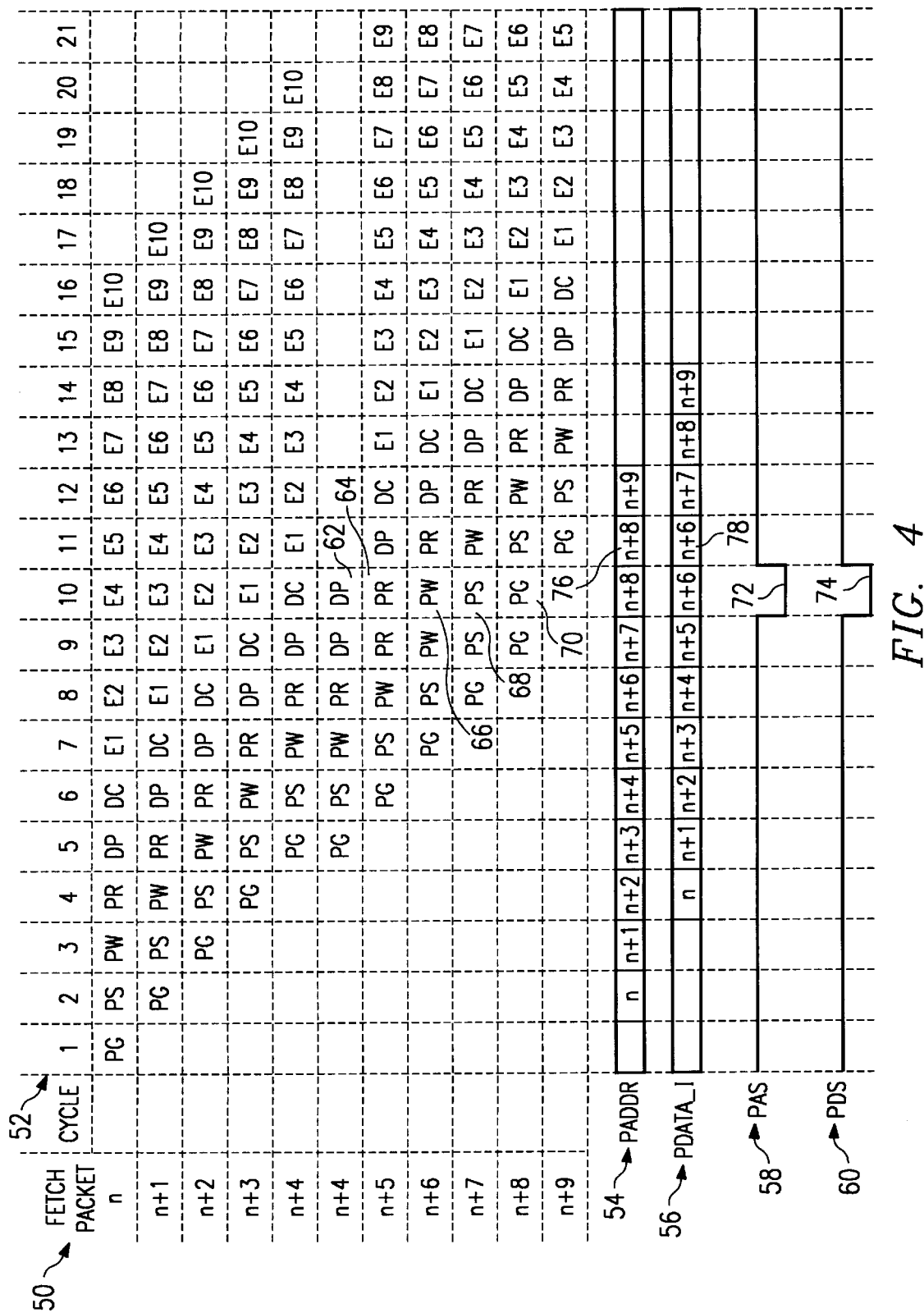
FIG. 4 is a chart listing the pipeline operations for ten fetch packets across twenty one cycles.

FIG. 4 is a chart listing the pipeline operations for ten fetch packets, n, n+1, . . . n+9, across twenty one cycles, in which fetch packet n+4 has a 2-cycle NOP instruction. Fetch packets, n, n+1, . . . n+9, are shown in column 50, while cycles are shown in row 52. The progress of a given fetch packet is traced across its row. At the bottom of FIG. 3 are shown information for the PADDR data 54 and the PDATA_I data 56. Also shown at the bottom of FIG. 4 are the PAS signals 58 and the PDS signals 60.

In FIG. 4, the following notations, set forth in Table 1, apply.

TABLE 1

| Pipeline Phase | Symbol | During This Phase |
| --- | --- | --- |
| Program Address Generate | PG | Address of fetch packet determined |
| Program Address Send | PS | Fetch packet address sent to PMS |
| Program Wait | PW | Program memory access performed |
| Program Data Receive | PR | Fetch packet expected at CPU boundary |
| Dispatch | DP | Next execute packet in fetch packet determined and sent to be decoded |
| Decode | DC | Instructions decoded |
| Execute 1, 2, etc. | E1, E2, etc. | First, second, etc., execute phases |

Note that the DP stage responds to the detection of a multi-cycle NOP. When a multi-cycle NOP is detected, it causes the fetch packets in the PR, PW, PS and PG phases to stall for a cycle. Thus, the DP stalls for fetch packet n+4 62, PR stalls for fetch packet n+5 64, the PW stalls for fetch packet n+6 66, PS stalls for fetch packet n+7 68, and PG stalls for fetch packet n+8, 70.

As a result of the stall across cycles 9–10, the PAS 58 and PDS 60 are held inactive 72, 74, during cycle 10, thus preventing the PMS from advancing. The PADDR 54 is held for fetch packet n+8 76 during cycle 10, and the PDATA_I for fetch packet n+6 is also held 78 during cycle 10, as well, all retaining the system coherency during the stall.

Figure 5:
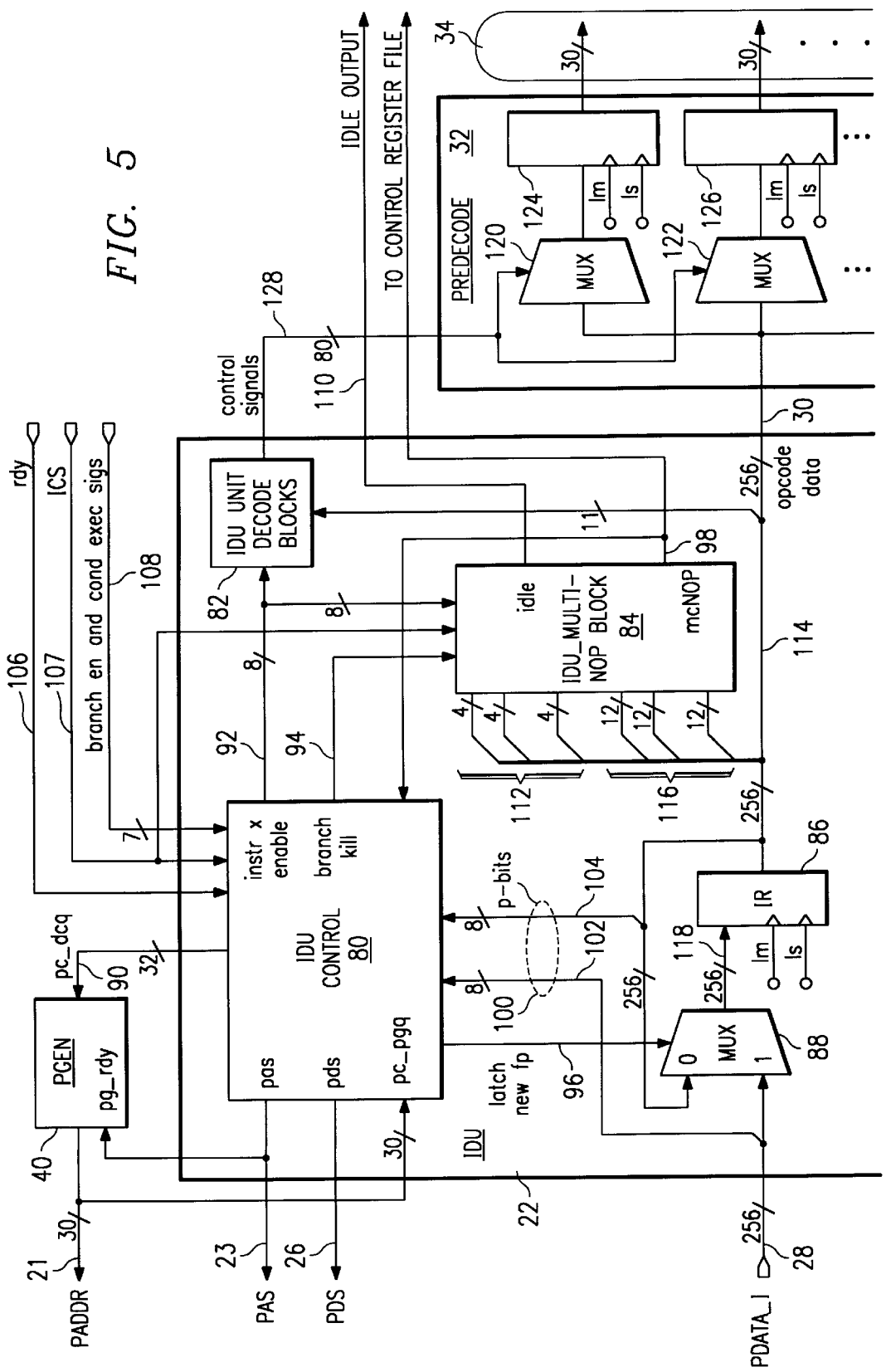
FIG. 5 is a block diagram of the IDU 22 of FIG. 3.

The multi-cycle NOP method and apparatus of the preferred embodiment of the present invention are implemented in the IDU 22, as will now be described. FIG. 5 shows a block diagram of the IDU 22 of FIG. 3, along with portions of the PGEN 40 and predecode unit 32 of FIG. 3. The PADDR line 21, PAS line 23, PDS line 26, PDATA_I line 28, EP lines 30 and EPM lines 34 can be seen, as well.

Inside the IDU 22 can be seen an IDU control block 80, IDU unit decode blocks 82, an IDU multi-cycle NOP block 84, an instruction register 86 and a first multiplexer 88. The IDU control block 80 has as outputs PAS line 23, PDS line 26, pc_dcq lines 90, instruction x enable signal lines 92 and a branch kill signal line 94. The PAS line 23 is also provided to the pg_rdy input of the PGEN 40. The pc_dcq signal lines 90 are inputs to the PGEN 40. The instruction x enable signal lines 92 are inputs to the IDU unit decode blocks 82 and to the IDU multi-cycle NOP block 84. The branch kill signal line 94 output line of IDU control block 80 is also an input to the IDU multi-cycle NOP block 84. A latch new fetch packet signal line 96 is also provided as an output of IDU control block 80, and this signal line is provided to the control input to the first MUX 88.

The PADDR output of PGEN 40 is provided to the pc_pgq input of the IDU control block 80. Another input to IDU control block 80 is the multi-cycle NOP indicator output line 98 of the IDU multi-cycle NOP block 84. The multi-cycle NOP indicator output line 98 is also provided to the control register file else where in the microprocessor. Other inputs to the IDU control block 80 are the p-bits lines 100 of the PDATA_I lines 28. These p-bit lines are provided on lines 102 taken from the PDATA_I lines 28 at the input to IDU 22 and their latched versions are provided on the corresponding bit lines 104 taken from the output lines 114 of the IR register 86. Finally, the IDU control block 80 also receives as inputs a ready signal, rdy, on line 106, an interrupt context switch ("IGS") signal on line 107, and branch enable and conditional execution signals on lines 108. Note that the rdy signal is a global signal in the microprocessor used to stall the pipeline.

The other output of the IDU multi-cycle NOP block 84 is the idle indicator line 110, which is provided as the IDLE signaling output of the IDU 22. The other inputs to the IDU multi-cyde NOP block 84 are a first group 112 of four bit lines each from the eight latched PDATA_I instructions provided as outputs of the IR 86 on lines 114, and a second group 116 of twelve bit lines each from lines 114.

The PDATA_I lines 28 are provided as the "1" input to the first MUX 88. The output lines 114 of the IR 86 are provided as the "0" input of the first MUX 88. The output of the first MUX 88 is provided on lines 118 to the data input of IR 86. IR 86 is clocked by the system master clock, "1m" and by the system slave clock, "1s", which are provided as inputs to IR 86, as shown.

Inside the predecode unit 32 can be seen a second MUX 120, a third MUX 122, a first predecode output latch 124 and a second predecode output latch 126. The first and second predecode output latches 124 and 126 are docked by the system master dock, "1m" and by the system slave clock, "1s", which are provided as inputs, as shown. The MUX-latch combinations 120–124, 122–126, shown in the predecode unit 32 are two of ten such combinations in predecode unit 32. Only two are shown in the interest of brevity. The other eight such combinations maybe the same as the two shown in FIG. 4. I.e., each such latch, 124, 126, etc. may have a thirty bit wide output, the aggregate of which outputs comprise the EPM lines 34 of FIG. 3. The reason that there are ten such MUX-latch combinations is that instruction data for each of the execute units is latched in such MUX-latch combinations, and there are ten execute units in the microprocessor in which the preferred embodiment is implemented, five in group 16 and five in group 17 shown in FIG. 1. Such execute units may each require thirty bits of the instruction. However, it may be that given ones of the execution units require fewer bits of the instruction. For example, in the microprocessor implementation in which the preferred embodiment is implemented, two of the execute units only require fifteen of the instruction bits. Accordingly, the MUX and latch for those two units are only fifteen bits wide. Hence, the width of the EPM lines 34 is only 270 bits, as shown.

The IDU unit decode blocks 82 provide as outputs signal lines 128, which are provided to the control inputs of the ten MUXs of the predecode unit 32, e.g., the second MUX 120 and the third MUX 122. The 256 bits comprising the OP code bits for each of the eight instructions comprising the fetch packet data are latched in the IR register 86 and provided on lines 30 as the inputs to the ten MUXs of the predecode unit 32, e.g., the second MUX 120 and the third MUX 122. etc.

In operation, the eight instructions comprising the fetch packet data, PDATA_I, are provided on line 28 to the "1" input of the first MUX 88. Provided the latch new fetch packet line 96 is active, indicating that a new fetch packet is to be latched in IR 86, the "1" input of MUX 88 is selected, and the PDATA_I are passed through, via lines 118, to the IR 86, where they are latched by the action of the system master and slave clocks, lm and ls, respectively. On the other hand, if the latch new fetch packet line 96 is not active, indicating that a new fetch packet is not to be latched in IR 86, then the "0" input of MUX 88 is selected, the existing contents of IR 86 are recirculated, via lines 118, into IR 86 to be latched again in the next cycle.

The OP code data of the PDATA_I are provided on lines 30 to the inputs of the MUXs of the predecode unit 32, e.g., MUX 120, MUX 122, etc. Under control of the control signals on lines 128, data from one, or none, of the eight instructions on lines 30 is selected by each of the MUXs of the predecode unit 32, latched in the respective output latch by the action of the system master and slave clocks, lm and ls, respectively, e.g., latch 124, latch 126, etc., and provided on lines 34.

The control signals on lines 128 are generated as follows.

Initially, the eight p-bits of the eight respective fetch packet instructions provided on the PDATA_I lines 28 are immediately provided on line 102 to the IDU control block 80. The IDU control block 80 examines the p-bits and determines which instructions to execute in parallel, and in what order, as described above. Based on this determination, the IDU control block 80 asserts one or more of the instruction enable signals on lines 92, in the appropriate cycle for the execute packet for the associated instruction or instructions.

The p-bits are kept available for subsequent cycles, as the dispatching of the execute packets from the current fetch packets may cross several cycles, via lines 104.

The IDU unit decode blocks 82 receive the instruction x enable signals line 92, as well as the PDATA_I on line 114, and generates the appropriate control signals, which it applies on lines 128 to effect the appropriate selection of MUXs in the predecode unit 32. The unit decode block 82 control signal outputs 128 thus affect the assignment of instructions to functional units.

In examining the p-bits, the IDU control block 80 also determines whether to assert the latch new fetch packet line 96. If the latch new fetch packet line 96 is asserted, the next fetch packet is allowed to be latched in IR 86. On the other hand, if the latch new fetch packet line 96 is de-asserted, the next fetch packet is prevented from being latched in IR 86. The latch new fetch packet line 96 is asserted under either of the following conditions, 1) the execute packets in the current fetch packet have been exhausted, indicating the need for a new fetch packet, or 2) the target of a branch is made available to be latched.

The IDU control block 80 also generates the PAS and PDS signals, as described above, while the PGEN unit 40, in response to the pc_dcq signal on the pc_dcq line 90, and to the PAS signal applied to the pg_rdy input of the PGEN unit 40, generates the PADDR signals, to effect the fetching of the fetch packets, all as described above in connection with FIG. 2.

After the fetch packet data are latched in IR 86, it is available on lines 114. The twelve bits of the op codes for each of the eight fetch packet instructions, bits 1–13 (FIG. 2), are provided to the IDU multi-cycle NOP block 84 on lines 116. At the same time, the four bits of the src field of each of such instructions, bits 14–17 (FIG. 2), are provided on lines 112 to the IDU multi cycle NOP block 84. The IDU multi cycle NOP block 84 examines these data, and, based on the data on lines 116, determines which, if any, of the instructions in the current fetch packet are multi-cycle NOPs, and if so, based on the data on lines 112, how many cycles are to be NOP-ed. If a multi-cycle NOP is detected, then, in the appropriate cycle, for example, the second DP cycle of the multi-cycle NOP instruction, for the execute packet in which the multi-cycle NOP instruction is determined, the multi-cycle NOP indicator line 98 is asserted, signaling this event to the IDU control block 80. The DP phase of a multi-cycle NOP instruction is determined by the instr x enable lines 92. These lines determine which src fields 112 and opcode fields 116 are examined for the presence of a multi-cycle NOP in any given cycle. This second DP cycle is preferred for performance reasons. This line is held active for as many cycles as the IDU multi cycle NOP block 84 determines the multi-cycle NOP instruction is to be executed. Alternatively, if an src field value of "1111" is detected, indicating that the instruction is an IDLE instruction, the multi-cycle NOP indicator line 98 is asserted continuously, until the microprocessor is reset or interrupted, by the activation of the interrupt context switch line 107. Also, in the event of the detection of an IDLE instruction, an idle indicator signal is placed on line 110, providing the IDLE output for signaling to other parts of the microprocessor. Note that the interrupt context switch line 107 is active from recognition of interrupt to the PR stage of the interrupt service routine.

In response to detecting that the multi-cycle NOP indicator line 98 is asserted, the IDU control block 80 pulls all of the instruction x enable signals low, preventing further instruction dispatch activity as long as the multi-cycle NOP indicator line 98 is asserted, thus effecting the NOP, or IDLE, as the case may be.

The generation of the multi-cycle NOP indicator signal and idle indicator signal is performed in the IDU multi cycle NOP block 84, as described above. The IDU multi cycle NOP block 84 is shown in detail in FIGS. 6–8.

Figure 6:
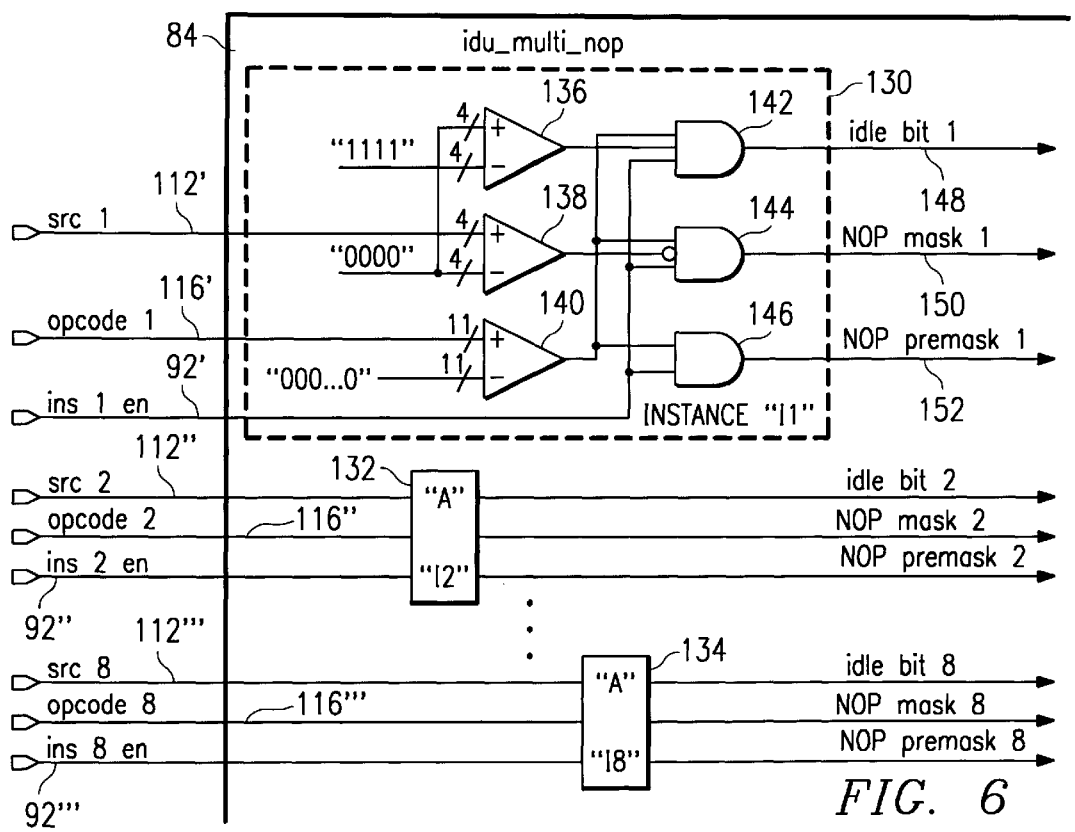
FIG. 6 is a diagram showing a first portion of the IDU multi-cycle NOP block 84 of FIG. 5.

Referring now to FIG. 6, a first portion of the IDU multi cycle NOP block 84 is shown, which comprises eight sub-blocks, of which three are shown, instance I1 30, instance I2 132, and instance I8 134., which operate on data for instruction positions 1, 2 and 8 in the current fetch packet, respectively. Instances I3 through I7 are not shown, in the interest of brevity, however they are the same as instances I1 130, I2 132 and I8 134, only operating on their respectively numbered instructions in the fetch packet. The internal construction of instance I1 130 only is shown, again in the interest of brevity, as all other instances have the same construction.

As can be seen, the source field for the first instruction in the current fetch packet, src1, is provided on lines 112' to a first, four bit wide input of a first comparator 136 and to a first, four bit wide input of a second comparator 138. The second, four bit wide input to the first comparator 136 is a forced value of "1111", while the second, four bit wide input to the second comparator 138 is a forced value of "0000". The OP code for the first instruction in the current fetch packet, OP code 1, is provided on lines 116' to a first, eleven bit wide input of a third comparator 140. The second, eleven bit wide input to the third comparator 140 is a forced value of "00000000000", i.e., eleven zeros.

The output of the first comparator 136 is provided to a first input of a first AND gate 142. The output of the second comparator 138 is provided to a first, inverting input of a second AND gate 144. The output of the third comparator 140 is provided to a second input of the first AND gate 142, to a second, non-inverting input of the second AND gate 144, and to a first input of a third AND gate 146. Finally, the first instruction enable signal on line 92', is provided to a third input to the first AND gate 142, to a third, non-inverting input to the second AND gate 144, and to a second input of the third AND gate 146.

The output of the first AND gate 142 is an idle bit 1 signal, provided on line 148. The output of the second AND gate 144 is a NOP mask 1 signal, provided on line 150. The output of the third AND gate 146 is a NOP premask 1 signal provided on line 152.

Note that the same input signals as those provided to instance I1 are provided to instances I2, . . . I8, only bearing the number for the position of the respective instruction in the current fetch packet, e.g., src2 is provided to instance I2, and so forth. Likewise, the same output signals as those provided from instance I1 are provided from instances I2, . . . I8, only bearing the same number for the position of the respective instruction in the current fetch packet, e.g., idle-bit 2, and so forth.

In operation, if a "1111" is detected on line 112', i.e., src1 is a "1111", then the output of the first comparator 136 is a "1". On the other hand, if a "0000" is detected on line 112', i.e., src1 is a "0000", then the output of the second comparator 138 is a "1". Finally, if a "00000000000" is detected on line 116', i.e., OP code 1 has that value, then the output of the third comparator 140 is a "1".

Note that in this document reference to an "active" signal line means the same thing as that line being at a logic "1", or simply "1".

If an IDLE instruction is encountered in position 1 in the fetch packet, then OP code 1 has the value "00000000000" and src1 has the value "1111". Thus, the outputs of the first comparator 136 and the third comparator 140 are a "1". If the first instruction enable signal, instruction 1 enable, is asserted, then all inputs to the first AND gate 142 are a "1", and the idle bit 1 output on line 148 is a 1. Both inputs to the third AND gate 146 are also at a "1" in this case, and the NOP premask 1 output on line 152 is also a "1". Finally, in this case the output of the second comparator 138 being a "0", the output of the second AND gate is also a "1". If, however, the instruction 1 enable signal on line 92' is not a "1" in the cycle of interest, then instruction 1 is not active in that cycle, and thus none of the idle bit 1, NOP mask 1 or NOP pre-mask 1 outputs is active.

If a NOP instruction is present in the first position in the current fetch packet, then the OP code 1 signal is, as in the case of an IDLE instruction, a value of "00000000000". If the instruction 1 enable signal is also a "1", then the NOP premask 1 signal on line 152 is active. If the value of src1 is also not a "0000" then the NOP mask 1 signal on line 150 is also active. The idle bit 1 signal on line 148, however, is inactive in both of these cases, since the source field is not a "1111" value.

The same logic applies to the generation of the output signals for the other instances, I2, . . . I8, for the instructions in their corresponding positions in the fetch packet.

Figure 7:
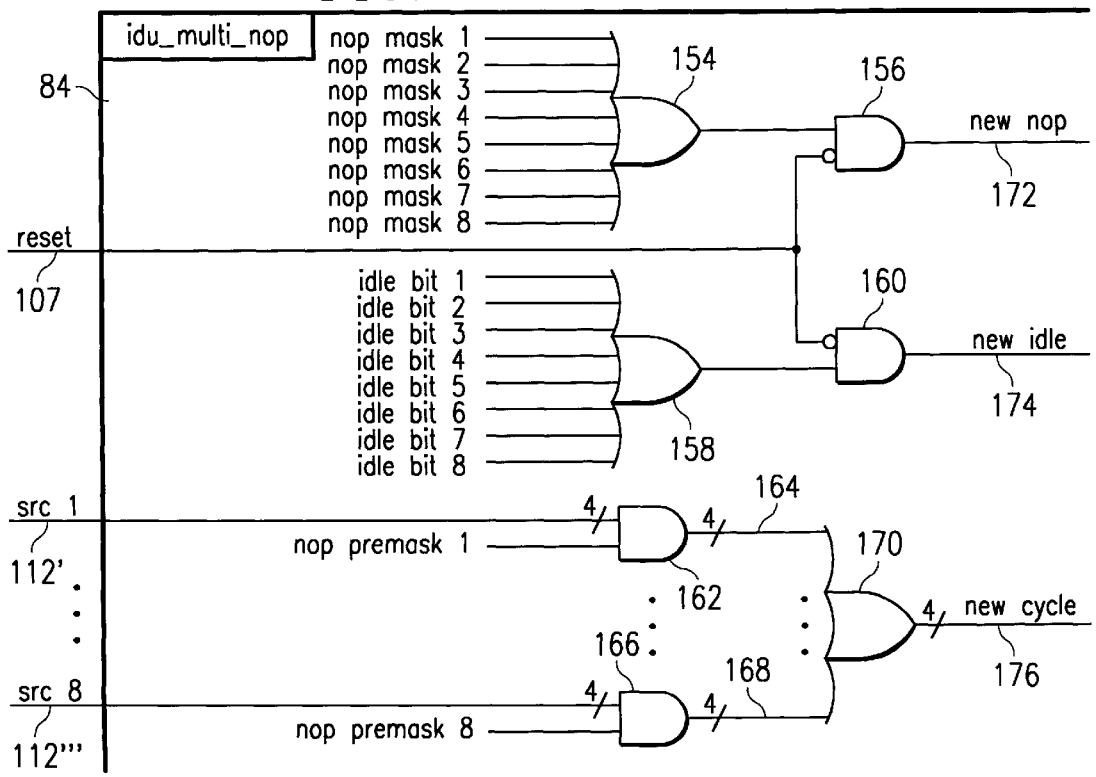
FIG. 7 is a diagram showing a second portion of the IDU multi-cycle NOP block 84 of FIG. 5.

Referring now to FIG. 7, a second portion of the IDU multi cycle NOP block 84 is shown. The interrupt context switch signal on line 107 is provided as an input, as shown. The source field values for all eight instructions in the current fetch packet, src1, src2, . . . src 8, are also provided as inputs. Only src1 on line 112' and src 8 on line 112''' are shown, however, in the interest of brevity. The eight NOP mask signals, NOP mask 1, NOP mask 2, . . . NOP mask 8 are also provided as inputs to a first OR gate 154. The output of the first OR gate 154 is provided to a first, non-inverting input of a first AND gate 156. The eight IDLE bit signals, idle bit 1, idle bit 2, . . . idle bit 8, are provided as inputs to a second OR gate 158. The output of the second OR gate 158 is provided to a first, non-inverting input of a second AND gate 160. The interrupt context switch signal on line 107 is provided to a second, inverting input to both the first AND gate 156 and to the second AND gate 160. The output of the first AND gate 156 is a "new NOP" signal. The output of the second AND gate 160 is a "new idle" signal.

The circuitry of FIG. 7 thus far described operates to pass through the active NOP mask signal as "new NOP", unless the reset signal is asserted, and to pass through the active idle bit signal as the "new idle" signal, unless the reset signal is asserted.

The four src1 bits on line 112' are provided to a first set of inputs of a first multiple AND gate 162. The NOP premask 1 signal is also provided as an input to the first multiple AND gate 162. The output of the first multiple AND gate 162 is a four bit wide line 164. The first multiple AND gate 162 operates as follows. If the NOP premask 1 value is a "0" then the output of the first multiple AND gate 162 is all "0s". On the other hand, if the NOP premask 1 value is a "1", then the output of the first multiple AND gate 162 is whatever the value of src1 is.

The four src bit values for instructions at positions 2, 3, . . . 8, are also provided to multiple AND gates having the same behavior as the first multiple AND gate 162. However, only the first multiple AND gate 162 and the eighth multiple AND gate 166, having output lines 168, are shown, in the interest of brevity. The outputs of all such multiple AND gates are provided as inputs to a multiple OR gate 170, as shown. The output of the multiple OR gate 170 is a "new cycle" signal.

The circuitry just described that generates the "new cycle" signal operates as follows. All of the bit positions for all of the multiple AND gate outputs are input to multiple OR gate 170 and are ORed together. Thus, all of the first bit positions for the AND gate outputs are ORed together, all of the second bit positions for the AND gate outputs are ORed together, and so forth. Since, in operation of the microprocessor in which the preferred embodiment is implemented, only one multi-cycle NOP instruction is permitted in a given execute packet, only the src field for, at most, one of the instructions in the current fetch packet is passed through as an output of one of the AND gates, and, thus, only the src field for that NOP instruction is provided as the output of the multiple OR gate 170.

Figure 8:
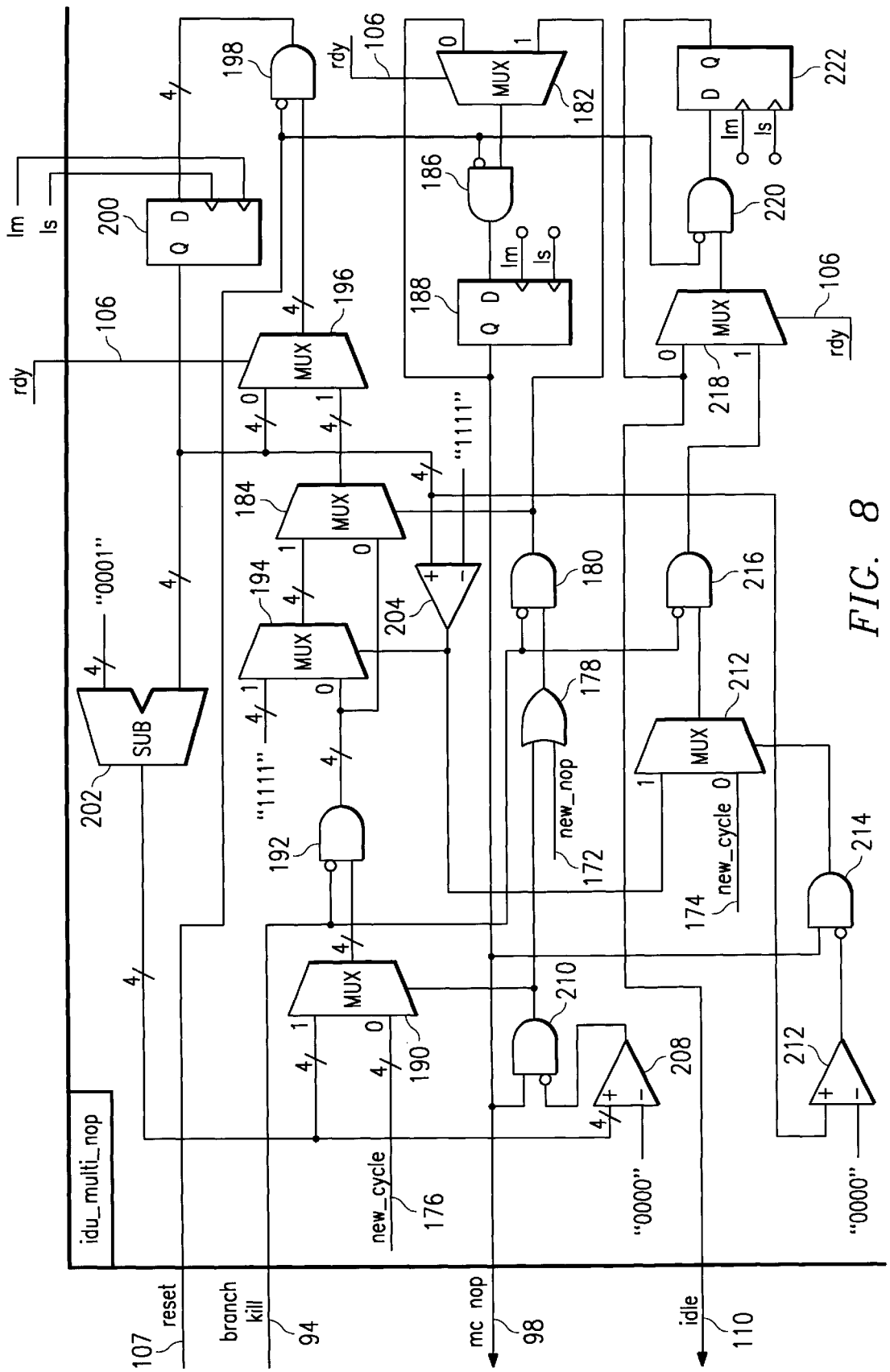
FIG. 8 is a diagram showing a third portion of the IDU multi-cycle NOP block 84 of FIG. 5.

Turning now to FIG. 8, the third portion of the IDU multi cycle NOP block 84 is shown. As can be seen, input signal lines to this portion are the interrupt context switch signal line 107, the branch kill signal line 94, both shown in FIG. 5 and discussed above in connection therewith, and the new cycle signal lines 176, the new NOP signal line 172 and the new idle signal line 174, all shown in FIG. 7 and discussed above in connection therewith. Output signal lines are the multi-cycle NOP indicator signal line 98 and the idle indicator signal line 110., both shown in FIG. 5 discussed above in connection with therewith.

The new NOP signal line 172 is provided as an input to a first OR gate 178. The output of OR gate 178 is provided as a first, non-inverting input to a first AND gate 180. The branch kill signal line 94 is provided as a second, inverting input to the first AND gate 180. The output of AND gate 180 is provided to the "1" input to a first MUX 182 and to the control input of a second MUX 184. The output of MUX 182 is provided to a first, non-inverting input to a second AND gate 186. The interrupt context switch line 107 is provided as a second, inverting input to AND gate 186. The output of AND gate 186 is provided to the data input of a first latch 188. The Q output of latch 188 is the multi-cycle NOP indicator signal line 98. The Q output of latch is also provided to the "0" input of MUX 182. The rdy signal line 106 is provided to the control input of MUX 182. Data in latch 188 is thus recirculated during a pipeline stall.

The four bit wide new cycle signal lines 176 are provided to the "0" inputs of a third MUX 190. The four bit wide output of MUX 190 is provided as first, non-inverting inputs to a first, multiple AND gate 192. The branch kill signal line 94 is provided as a second, inverting input to all of the multiple AND gate 192. A "0" at the second input to AND gate 192 causes the signals on the first inputs to be provided to the four bit wide output lines of AND gate 192. A "1" at the second input to AND gate 192 forces all "0s" at the output lines of AND gate 192. The output lines of AND gate 192 are provided to the "0" inputs to a fourth MUX 194, and to the "0" inputs of MUX 184. The four "1" inputs to MUX 194 are forced to "1111". The four bit wide outputs of MUX 194 are provided to the "1" inputs to MUX 184. The four bit wide outputs of MUX 184 are provided to the "1" inputs to a fifth MUX 196. The four bit wide outputs of MUX 196 are provided to a first, non-inverting input to a second multiple AND gate 198. The interrupt context switch line 107 is provided to a second, inverting input to multiple AND gate 198. Multiple AND gate 198 functions in the same way as multiple AND gate 192, i.e., a "0" at the second input to AND gate 198 causes the signals on the first inputs to be provided to the four bit wide output lines of AND gate 198, while a "1" at the second input to AND gate 198 forces all "0s" at the output lines of AND gate 198. The four bit wide output lines of AND gate 198 are provided to the data inputs of a second multiple latch 200.

The four bit wide Q output of latch 200 is provided to the "0" inputs to MUX 196, to the plus input of a subtraction unit 202, to a first input of a first comparator 204, and to a first input of a second comparator 206. The rdy signal line 106 is provided to the control input of MUX 196. The four bit wide second inputs to comparator 204 are forced to "1111". The four bit wide minus inputs to subtraction unit 202 are forced to "0001". The four bit wide output of subtraction unit 202 is provided to the "1" inputs to MUX 190 and to a first input to a third comparator 208. The four bit wide second input to comparator 208 is forced to "0000". The output of comparator 208 is provided to a first, inverting input of a third AND gate 210. The Q output of latch 188 is provided to a second, non-inverting input to AND gate 210. The output of AND gate 210 is provided to the control input of MUX 190 and to a second input of OR gate 178.

The output of comparator 204 is provided to the control input of MUX 194 and to the "1" input of a sixth MUX 212. The new idle signal line 174 is provided to the "0" input of MUX 212.

The four bit wide second inputs to comparator 206 are forced to "0000". The output of comparator 206 is provided to a first, inverting input to a fourth AND gate 214. The Q output of latch 188 is provided to the second, non-inverting input to AND gate 214. The output of AND gate 214 is provided to the control input to MUX 212. The output of MUX 212 is provided to a first, non-inverting input to a fifth AND gate 216. The branch kill signal line 94 is provided to a second, inverting input to AND gate 216. The output of AND gate 216 is provided to the "1" input to a seventh MUX 218. The output of MUX 218 is provided to a first, non-inverting input to a sixth AND gate 220. The interrupt context switch signal line 107 is provided to a second, inverting input to AND gate 220. The output of AND gate 220 is provided to the data input of a third latch 222. The Q output of latch 222 is provided to the "0" input of MUX 218 and is also provided on the idle indicator output line 110. The rdy signal line 106 is applied to the control input of MUX 218.

All three latches, latch 188, latch 200 and latch 222, are clocked by the system master clock, "lm" and by the system slave dock, "ls", which are provided as inputs thereto, as shown.

The circuit of FIG. 8 operates as follows. When a new NOP signal is received on new NOP signal line 172, provided the branch kill signal line 94 is inactive, the new NOP signal is passed through OR gate 178 and AND gate 180. If the rdy signal line 106 is active, and if the interrupt context switch line 107 is active, MUX 182 and AND gate 186 pass the new NOP signal to latch 188, where it is latched in response to the assertion of the system clocks, lm and ls. After so latching this signal, the Q output of latch 188 is active and is applied to the multi-cycle NOP indicator signal line 98, indicating that a NOP delay slot is to be inserted in the pipeline. The mechanism of keeping the latch 288 at a logic '1' is via the multi-cycle NOP indicator line 98 feeding back through OR gate 178. On the other hand, if the reset signal line goes active, the output of AND gate 186 is forced to "0", and the multi-cycle NOP indicator line goes inactive when this "0" is latched in latch 188, thus killing the NOP indication.

At the same time, the value on the new cycle line 176, which is the value of the src field of the current NOP instruction, is provided to the "0" input of MUX 190. It will be recalled that this value is the number of times that the NOP instruction should be repeated. If there is not an active multi-cycle NOP instruction currently being dispatched, then the control input will be at a "0" value, thus causing MUX 190 to select the value on the new cycle line 176, passing it through to multiple AND gate 192. Provided the branch kill signal line 94 is inactive, this value is passed through to the "0" input of MUX 194. If there is not an active IDLE instruction currently being dispatched, then the control input will be at a "0" value, thus causing MUX 194 to select the value on the output of AND gate 192, passing it through to the "1" input of MUX 184. If a new NOP instruction is being processed (and if the branch kill signal line is inactive), the new NOP line 172 is active and the output of AND gate 180 is active, thus causing the "1" input of MUX 184 to be selected. The output of MUX 184 is applied to the "1" input of MUX 196 which, if the rdy line 106 is active, is selected by MUX 196. The output of MUX 196 is applied to multiple AND gate 198 where, provided the interrupt context switch line 107 is inactive, it is applied to the data input of latch 200, where it is latched in response to the assertion of the system clocks, lm and ls. This signal, the src value for the current NOP instruction, is latched by latch 200, providing it to the Q output of latch 200.

The value thus latched is applied to the subtract unit 202, where "0001" is subtracted from it. The result of this subtraction is compared against "0000" in comparator 208. If the result of the subtraction is non-zero, meaning that the NOP instruction is to be repeated again, the output of comparator 208 is zero, allowing the existing active value on the multi-cycle NOP indicator line 98 to be passed through AND gate 210, and so forth to keep latch 188 latched active.

The result of the subtraction is, it will be recalled, also applied to the "1" input of MUX 190. Since the output of AND gate 210 is a "1" at this time, since a NOP instruction is being processed and therefore the multi-cycle NOP indicator line is active, the "1" input of MUX 190 is selected. This passes the result of the subtraction to the input of multiple AND gate 192, where, provided the branch kill signal line 94 remains inactive, it is applied to the "0" input of MUX 194. Provided latch 200 has latched a value other than "1111", meaning that an IDLE instruction is not being processed, the output of comparator 204 is a "0" which causes the "0" input of MUX 194 to be selected. Thus, the result of the subtraction is passed through to the "1" input of MUX 184. If a multi-cycle NOP instruction is being processed, and the branch kill signal line 94 is inactive, the output of AND gate 180 is a "1" which causes the "1" input of MUX 184 to be selected. Thus, the result of the subtraction is passed through to multiple AND gate 198. Provided the interrupt context switch line 107 is inactive, the result of the subtraction is passed through to the input of latch 200, where it remains latched in response to the assertion of the system clocks, lm and ls. This value is then subtracted in subtract unit 202, and the result of the subtraction processed as described above. In this way, the NOP repetition count is decremented by "1" every cycle until it decrements to "0" or a higher priority event pre-empts the multi-cycle NOP and resets the repetition count.

Once the result of the subtraction is zero, meaning that the NOP instruction is not to be repeated again, the output of comparator 208 goes active, forcing the output of AND gate 210 to zero. This causes the output of OR gate 178 to go low, unless the new NOP line 172 is active indicating that a new multi-cycle NOP instruction is being processed. When the output of OR gate 178 goes low in this way, it causes a zero to be latched in latch 188, forcing the multi-cycle NOP indicator line low, indicating that the NOP count has been reached and no further delay slots are to be inserted into the pipeline. Also, the "0" input of MUX 184 is selected, opening the way for the src value in the next multi-cycle NOP instruction to be processed, i.e., the next new cycle value, to be latched in latch 200.

Finally, when a new idle signal is provided on the new idle signal line 174, assuming re-set conditions exist, this signal is passed through MUX 212 to AND gate 216. Provided the branch kill signal line 94 is inactive, the new idle signal is passed through AND gate 216 to MUX 218. Provided the rdy signal line 106 is active, the new idle signal is passed through MUX 218 to AND gate 220. Provided the interrupt context switch line 107 is inactive, the new idle signal is passed through to latch 222, where it is latched in response to the assertion of the system clocks, lm and ls. This value is then applied to the "0" input to MUX 218, and it activates the idle indicator line 110, indicating that an IDLE instruction is being processed. The assertion of the idle indicator line 110 stops further fetches, as discussed above in connection with FIG. 4. The mechanism for dispatching an IDLE instruction is identical to the mechanism for dispatching a multi-cycle NOP instruction, i.e., the multi-cycle NOP indicator signal line 98 is pulled high, eventually forcing NOPs into predecode. The only difference is that IDLE may only be preempted by the branch kill signal or the interrupt context switch signal. The one input of MUX 218 continues to be selected during an IDLE instruction, unless, for example, an emulation halt, or a memory access initiated prior to issuance of the IDLE instruction, causes a ready pipeline stall. The "1" input of MUX 212 will be a logic "1" due to the latched and recirculated "1111" NOP count for IDLE instructions. This perpetuates itself.

It will be appreciated from the above discussion that at various places in the circuit shown in FIG. 7 that either the activation of the branch kill signal line 94 or the activation of the interrupt context switch line 107 kills the processing of any current multi-cycle NOP instruction, and re-sets latches 188, 200 and 222, thus re-setting the entire circuit of FIG. 7. It will be appreciated from an examination of the circuit of FIG. 7 that the signal on interrupt context switch line line 107 is asserted at higher priority than the signal on the branch kill signal line 94.

Thus, a multi-cycle NOP instruction method and apparatus in accordance with a preferred embodiment of the present invention have been shown and described in detail hereinabove. However, although the present invention and its advantages have been described in detail, it should be understood that various changes, substitutions and alterations can be made herein without departing from the spirit and scope of the invention as defined by the appended claims.

What is claimed is:

1. A microprocessor having multi-cycle NOP functionality, responsive to a set of instructions retrieved from a storage element, said instructions including a multi-cycle NOP instruction, said multi-cycle NOP instruction including an OP code identifying it as a multi-cycle NOP instruction, and including a first indicator of a number of cycles of NOP for the microprocessor to implement in response to said multi-cycle NOP instruction, comprising:

first logic for retrieving instructions from storage;

second logic for decoding retrieved instructions and for dispatching said instructions to execution units, responsive to an enable line; and third logic for detecting a multi-cycle NOP instruction and, in response, inhibiting said enable line for said number of cycles indicated in said multi-cycle NOP instruction.

2. A microprocessor as in claim 1, wherein said first logic comprises an instruction dispatch unit.

3. A microprocessor as in claim 2, wherein said first logic comprises a program address generator subunit in said instruction dispatch unit.

4. A microprocessor as in claim 1, wherein said second logic comprises an instruction dispatch unit.

5. A microprocessor as in claim 4, wherein said second logic comprises a decoder block subunit in said instruction dispatch unit.

6. A microprocessor as in claim 1, wherein said third logic comprises an instruction dispatch unit.

7. A microprocessor as in claim 6, wherein said third logic comprises a multi-cycle NOP subunit in said instruction dispatch unit.

8. A microprocessor as in claim 7, wherein said first logic is capable of retrieving two or more instructions from storage in a single cycle, said instructions including a second indicator identifying which instructions retrieved in a single cycle are to be executed by said execution units in the same cycle;

wherein said second logic is responsive to two or more enable lines to for dispatching two or more instructions in a cycle in response to respective two or more of said enable lines;

wherein said second logic includes fourth logic to detect said second indicator in instructions retrieved in the same cycle and, in response thereto, activate an appropriate one or more of said enable lines in the appropriate cycle; and wherein said third logic inhibits all enable lines for said number of cycles indicated in said multi-cycle NOP instruction.

* * * * *